(12) United States Patent
Giordano

(10) Patent No.: US 9,924,646 B1
(45) Date of Patent: *Mar. 27, 2018

(54) SPRINKLER SYSTEM

(71) Applicant: Carl A. Giordano, Valley Cottage, NY (US)

(72) Inventor: Carl A. Giordano, Valley Cottage, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/655,521

(22) Filed: Jul. 20, 2017

Related U.S. Application Data

(63) Continuation of application No. 15/043,550, filed on Feb. 13, 2016, now abandoned.

(60) Provisional application No. 62/116,525, filed on Feb. 15, 2015.

(51) Int. Cl.
*A01G 25/16* (2006.01)
*B05B 12/00* (2018.01)
*B05B 12/04* (2006.01)

(52) U.S. Cl.
CPC .......... *A01G 25/165* (2013.01); *B05B 12/004* (2013.01); *B05B 12/04* (2013.01); *Y10T 137/86871* (2015.04)

(58) Field of Classification Search
CPC .... A01G 25/16; A01G 25/162; A01G 25/165; Y10T 137/86879; Y10T 137/86887; Y10T 137/86895

USPC ................... 239/607; 700/283, 284
See application file for complete search history.

(56) References Cited

U.S. PATENT DOCUMENTS

| | | | |
|---|---|---|---|
| 3,591,850 A | 7/1971 | Holm | |
| 3,927,693 A | 12/1975 | Johnston | |
| 4,270,573 A | 6/1981 | Sturman | |
| 4,287,907 A | 9/1981 | Worthy | |
| 4,516,596 A * | 5/1985 | Sugisawa | B08B 9/0323 137/240 |
| 5,746,250 A | 5/1998 | Wick | |
| 5,769,124 A | 6/1998 | Ehrhardt | |
| 7,131,460 B2 | 11/2006 | McLane | |
| 2010/0147158 A1 | 6/2010 | Muller | |
| 2013/0299023 A1 | 11/2013 | Rarig | |

* cited by examiner

*Primary Examiner* — Alexander Valvis
(74) *Attorney, Agent, or Firm* — Law Office of Carl Giordano, PC

(57) ABSTRACT

A sprinkler system to control distribution of water flow to a plurality of sprinkler heads, the heads providing an outlet to dispense water passing through a corresponding one of the plurality of sprinkler heads and a plurality of distribution control devices, one of the plurality of distribution control devices coupled to a corresponding one of the plurality of sprinkler heads, wherein the distribution control device controls water flow to an associated sprinkler heads for a first predetermined period of time when a flow of water through the distribution control device is detected.

14 Claims, 8 Drawing Sheets

PRIOR ART

SPRINKLER SYSTEM

CLAIM OF PRIORITY

This application claims, pursuant to 35 USC 120 priority to and the benefit of the earlier filing date, as a Continuation, of that patent application, afforded Ser. No. 15/043,550 filed on Feb. 13, 2016, which claimed, pursuant to 35 USC 119, priority to, and the benefit of, the filing date of that provisional patent application entitled, A Sprinkler System, filed on Feb. 15, 2015 and afforded Ser. No. 62/116,525, the content of all of which are incorporated by reference, herein.

FILED OF THE INVENTION

The inventor is related to the field of water distribution and more particularly to a serial water control system.

BACKGROUND

Lawn sprinkler systems and sprinkler devices are well known in the art. In a conventional lawn sprinkler system, a sprinkler head may include an input port, which through a hose connection is attached to a water source (e.g., a hose bib connected to a water supply). As water is presented to the sprinkler heads, the sprinkler head (e.g., impact sprinkler, fan sprinkler) projects the supplied water a known distance in a desired pattern (e.g., circular, semi-circular, fan shaped, bubble, drip etc.)

A typical sprinkler head may further include an outlet port, which allows a second sprinkler head to be connected in series to a preceding sprinkler head. The distance of the supplied water by the sprinkler, is dependent upon the pressure of the water delivered to the input port. Thus, the distance water is projected by a single sprinkler head is greater than the distance of the sprinkler head when two or more sprinkler heads are connected in series.

Thus, as additional sprinkler heads are added in series, the water pressure delivered to each sprinkler head decreases and the distance that the supplied water is projected from each of the sprinkler heads decreases.

FIG. 1A illustrates an exemplary sprinkler system configuration 100 wherein a water source 105 is connected, through a conduit (e.g., hose, piping, etc.) 130 to sprinkler head 110. Sprinkler head 110 may be a conventional impact sprinkler, for example, that projects the supplied water, in this illustrated example, in a circular pattern, with a radius R. The distance R that the water is projected is based primarily on the water pressure that is present at the input of the sprinkler head 110. In this illustrated example, a control unit 140 connects the sprinkler heads 110 to a corresponding hose segment 120. The control unit 140 may be an manual or an automatic timer device that provides water for a predetermined time. However, it would be appreciated that the conduit 130 may be connected directed to the water source 105.

FIG. 1B illustrates an exemplary sprinkler system incorporating a plurality of sprinkler heads 110 (represented as 110a, 110b . . . 110n) connected in series through hose segments 130 (represented as 130a, 130b, . . . 130n). Each sprinkler head 110 includes an input port 115 and an output port 120, wherein a free end of a first hose segment 130a is attached to a water source 105 (e.g., hose bib) and a free end of a second hose segment 130b is attached to the output port of one sprinkler head 110a while a second free end of hose segment 130b is attached to an input port of a second sprinkler head 110b. The output port 120 of the last sprinkler head 110n is capped.

In this illustrative example of a serial irrigation system when water from the source 105 is provided to the plurality of sprinkler heads 110a . . . 110n, the pressure at the input of each of the sprinkler heads 110a . . . 110n is decreased, as water is being distributed by the prior sprinkler head in the serial line. Hence, the projection of the provided water at each sprinkler head 110, distance R', is less than the distance when a full pressure is applied to a single sprinkler head.

Thus, a greater number of sprinkler heads is necessary to cover a large area. However, if too many sprinkler heads is placed in series, the pressure may insufficient to project the applied fluid any appreciable distance.

Generally, to cover larger areas, in-ground sprinkler systems are employed, wherein sprinkler heads 110 are typically placed in parallel groups of a plurality of sprinkler heads 110 as shown in FIG. 2.

FIG. 2 illustrates a conventional sprinkler system 200 including a plurality of sprinkler heads 110 grouped into a plurality of sprinkler groups (or paths). In this illustrated example the conventional sprinkler system 200 is composed of three parallel groups (paths) of serially connected sprinkler heads 110. It would be recognized that the number of parallel groups of serially connected sprinkler heads may be increased or decreased without altering the principles of the conventional sprinkler system.

As discussed with regard to the serial connection of FIG. 1B, the number of sprinkler heads 110 in each serial connection is limited based on the water pressure at the output of the water source 105 as water pressure continues to decrease at each sprinkler head, as previously discussed.

Also shown is a central controller 210 that operates to control each group of sprinkler heads 110 in a time division manner, wherein one group of a plurality of sprinkler heads 110 is operated at a given time. In this conventional sprinkler system 200, the central controller 210 provides a timed release of water to each group of sprinkler heads.

Conventional sprinkler systems 200, thus, may be constructed to provide irrigation coverage of large areas as the number of groups of sprinklers 110 may be increased.

However, such systems have significant cost in their initial installation and once installed, the cost to modify the system (i.e., redirecting feedlines, sprinkler heads, etc.) is also significant.

In addition, in areas with expected cold temperatures, the installed feed lines need be drained to prevent freezing of water remaining in the feed-lines. This requires generally a sufficiently pressurized air supply to be injected into each of the feed lines, one feed line at a time, to dispense any water remaining in the feed-lines.

In conventional sprinkler systems, coverage of large area requires additional sprinkler heads or expensive in-ground systems. Hence, there is a need in the industry for a sprinkler system and sprinkler devices that provide for ease of installation, and modification and further provides for large coverage areas.

SUMMARY OF THE INVENTION

A system to control distribution of water flow to water sprinkler nozzles is disclosed. The system comprises a plurality of sprinkler heads, said heads providing an outlet to dispense water passing through a corresponding one of said plurality of sprinkler heads and a plurality of distribution control devices, one of said plurality of distribution control devices coupled to a corresponding one of the plurality of sprinkler heads, wherein the distribution control device controls fluid (e.g., water) flow to an associated sprinkler heads for a first predetermined period of time when a flow of water through the distribution control device is detected.

DRAWINGS

For a better understanding of exemplary embodiments and to show how the same may be carried into effect, reference is made to the accompanying drawings. It is stressed that the particulars shown are by way of example only and for purposes of illustrative discussion of the preferred embodiments of the present disclosure, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

It is to be understood that the figures and descriptions of the present invention described herein have been simplified to illustrate the elements that are relevant for a clear understanding of the present invention, while eliminating, for purposes of clarity many other elements. However, because these omitted elements are well-known in the art, and because they do not facilitate a better understanding of the present invention, a discussion of such elements is not provided herein. The disclosure herein is directed to also variations and modifications known to those skilled in the art.

DETAILED DESCRIPTION

Figure 1A:
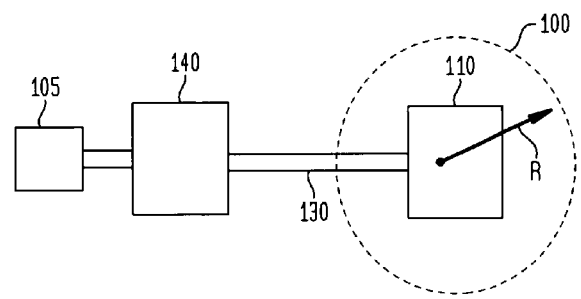
FIGS. 1A and 1B illustrate coverage patterns of a conventional irrigation system using conventional sprinkler heads.
Figure 3:
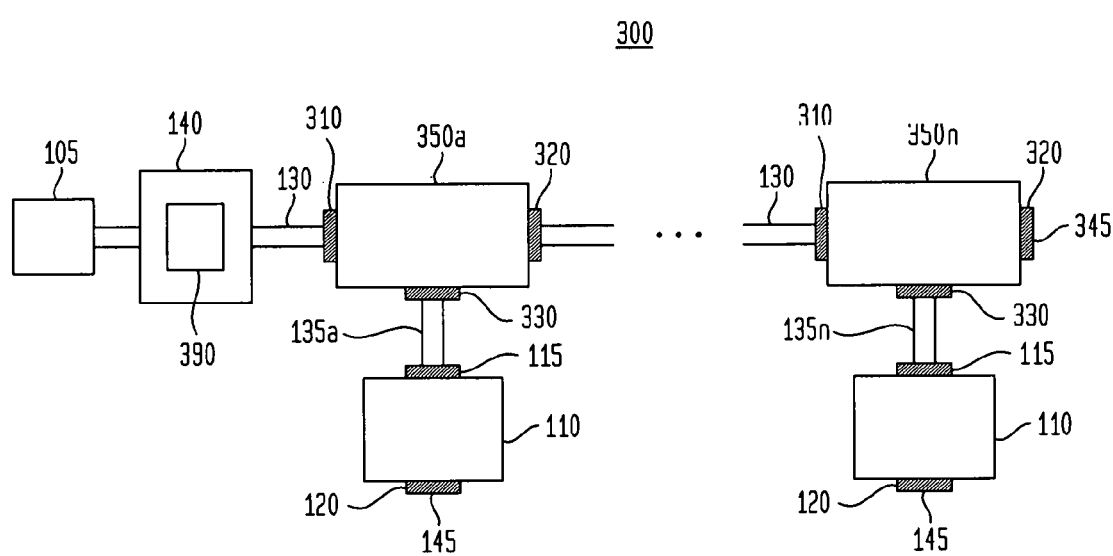
FIG. 3 illustrates an exemplary sprinkler system in accordance with the principles invention.

FIG. 3 illustrates an exemplary sprinkler system 300 in accordance with the principles of the invention. In this illustrative example, a controller (or control unit) 140 is connected to water source 105 as previously described (see FIG. 1A). A plurality of distribution devices 350 (individually referred to as 350a . . . 350n) are serially connected to controller 140 through connecting conduits (e.g., hose segments) 130 (130a, 130b . . . 130n).

An output 320 of distribution device 350 (e.g., 350(n−1) is connected to an input 310 of a next distribution device 350 (e.g., 350n) through corresponding conduits 130 (e.g., 130n).

Further illustrated is sprinkler head 110 (i.e., 110a . . . 110n) attached to an output 330 of corresponding distribution device 350 (i.e., 350a . . . 350n) through corresponding hose segments 135 (135a . . . 135n). Each of the hose segments 135 is connected on a first end to output port 330 of a corresponding distribution device 350 and on a second end to an input port 115 of sprinkler head 110.

In one aspect of the invention, system 300 may be controlled by controller 140, which includes a timer 390. Water control timers 390, are well known in the art. Generally, water control timer 390 allows water to flow (i.e., turn on) for a limited period of time. As water control timers are commercially available, a detailed discussion of their operation need not be discussed, herein.

In one aspect, the water timer 390 may be a mechanical countdown timer, wherein a timer dial is manually turned to a desired length of time. The mechanical countdown timer allows water to flow for the desired length of time. In another aspect, water timer 390 may be an electronic counter, wherein the timer is programmed to turn-on at preset times and for preset durations. In this case, the water timer may self turn-on at the preset time and allow water flow for the preset duration.

In accordance with the principles of the invention, distribution device 350 represents a further controller (i.e., a water control device) that operates to allow water to flow to one of a first output port 330 or to a second output port 320. In accordance with the principles of the invention, the flow of water is directed to a device (e.g., a connected sprinkler head 110 for a predetermined period of time) and then after the expiration of the predetermined period of time, water is directed away from the first output port 330 and directed toward the second output port 320.

In accordance with the principles of the invention, each sprinkler head 110 receives a full amount of pressure of the provided water flow for a predetermined or programmed time. In this case, the sprinkler head 110 essentially operates as a single sprinkler head 110 projecting the provided water a maximum distance (i.e., R, FIG. 1A).

At the expiration of a predetermined time, distribution device 350 (e.g., 350a) is configured such that water flow from the attached connected first sprinkler head 110 (e.g., 110a) at output port 330 is directed to a second distribution device 350 (e.g., 350b) or a second sprinkler head 110 connected to the second output port 320 of distribution device 350 (e.g., 350a).

In one aspect of the invention, when the second distribution device 350 (e.g., 350b) receives water from distribution device 350 (e.g., 350a), second distribution device 350b directs the received water to a first output port 330, wherein a corresponding sprinkler head 110 may be attached to the first output port 330 of distribution device 350b.

As previously discussed, the received water at distribution device 350b is applied to first output port 330 (e.g., 330b) for a second predetermined time. The second predetermined time may be independently set from that of the first predetermined time set associated distribution device 350b (or with any other distribution devices 350 in a serial line).

At the completion of the second predetermined time, water flow through distribution device 350b is directed toward the corresponding second output port (e.g., 320b). In this matter, the flow of water progresses from one distribution device 350 to a next distribution device in a neral manner, wherein the full amount of pressure is applied to an attached sprinkler head 110 for a predetermined or programmable time period.

Figure 4A:
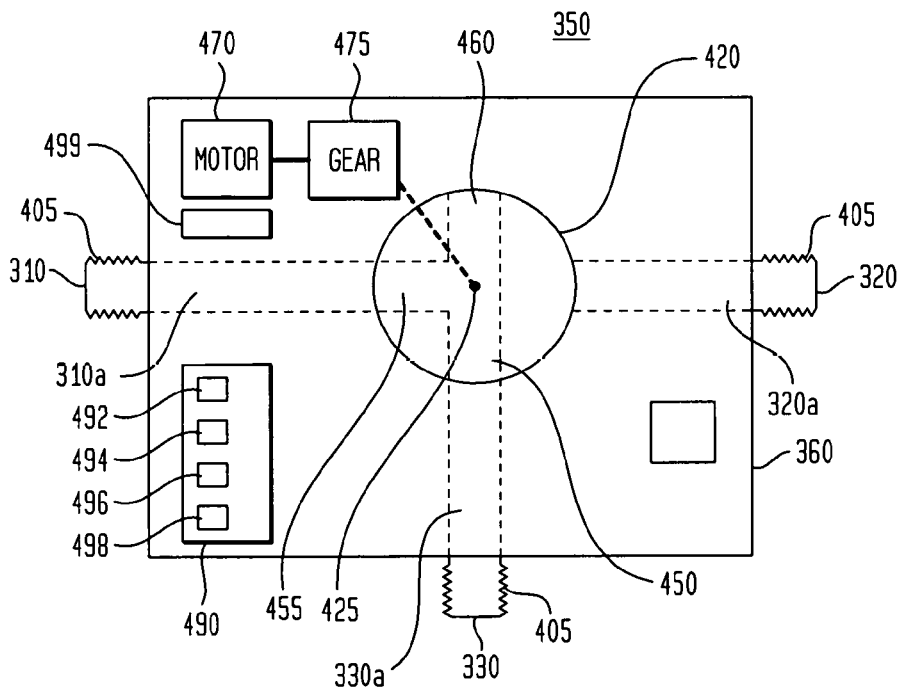
FIGS. 4A and 4B illustrate a water control device in accordance with a first embodiment in accordance with the principles of the invention.
Figure 4B:
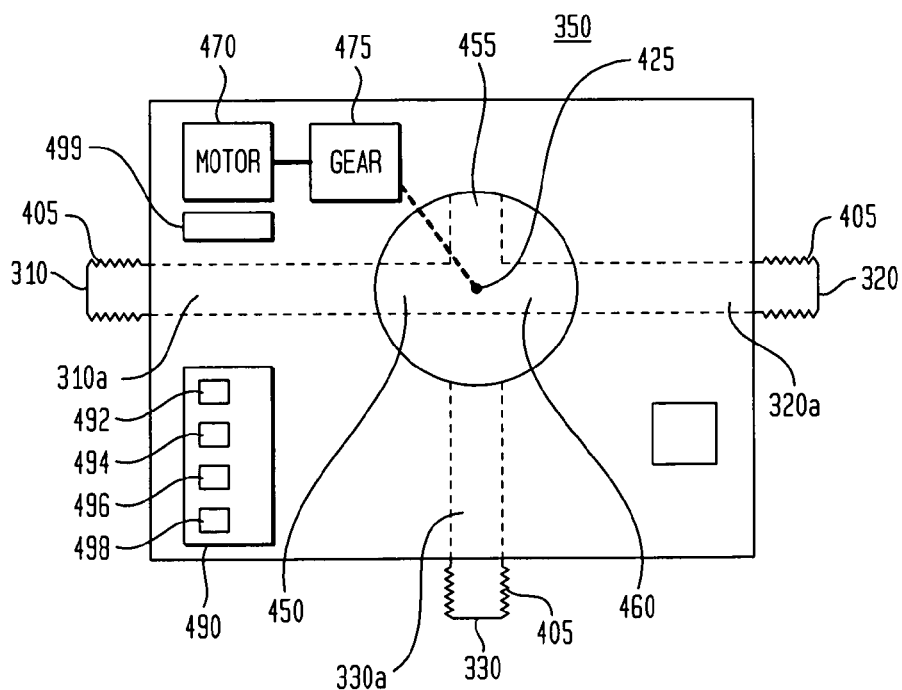

FIGS. 4A and 4B illustrate cross-sectional views of a first embodiment of distribution device 350 in accordance with a first aspect and a second aspect, respectively, of the invention.

Referring to FIG. 4A, in this illustrated example, distribution device 350 includes a housing 360 comprising an input port 310 and first output port 330 and second output port 320. Extending from input port 310 is an internal conduit or channel 310a. Conduit or channel 310a provides a means for transferring fluid entering input port 310 to connector 420. Connect 420, which is rotatable about axis 425, which is perpendicular to the plane of the illustrated connector 425 (i.e., directed into the plane of this paper) positions input port 310 to be in fluid communication with one of the first output port 330 or second output port 320 through corresponding conduits 330a and 320a, respectively.

The input port 310, the first output port 330 and the second output port 320 may incorporate a screw thread 405 that allows attachment of a corresponding port to a corresponding conduit 130, 135 (see FIG. 3, for example). In one aspect of the invention, the screw tread 405 may be a conventional thread associated with water hose connections.

Connector 420 includes a first input port 450 and a second input port 455 and an output port 460. As will be discussed first input port 450, in a first aspect of the invention of the invention shown in FIG. 4A, operates as an input port to receive water from a previous distribution device and in a second aspect of the invention, operates as an output port to distribute received water through first output port 330 (see FIG. 4B).

In accordance with the principles of the invention, the distribution device 350 applies a full pressure of fluid to one of the first output port 330 or the second output port 320 based on the orientation of connector 420.

In the illustrated aspect of the invention shown in FIG. 4A, first input port 450, operates as an output port, as being positioned in fluid communication with first output port 330 of distribution device 350 and second input port 455 is positioned in fluid communication with the input port 310 of distribution device 350. In this aspect of the invention, a full pressure of fluid flow (e.g., water) is provided to the first output port 330 and fluid flow is blocked from exiting through output port 320.

FIG. 4B illustrates a cross-sectional view of distribution device 350 in accordance with a second aspect of the invention.

In this illustrated aspect of the invention, input port 450 is positioned in fluid communication with first input port 310 of distribution device 350 and output port 460 is positioned in fluid communication with the second output port 320 of distribution device 350. In this aspect of the invention, a full pressure fluid flow is provided to the second output port 320 as water flows from input port 310 to output port 320 through connector 420.

In accordance with this aspect of the invention, fluid flow is directed from the input port 310 to one of the first output port 330 or the second output ort 320 based on the orientation of connector 420. In this illustrative embodiment, the first and second output ports, 330, 320, respectively, are oriented at substantially a ninety (90) degree angle with respect to each other. Furthermore, the first input port 450 of connector 420 is positioned at a substantially 90 degree angle with respect to the second input port 460 of connector 420.

Referring to FIG. 4A, also shown is motor 470. In accordance with the principles of the invention motor 470 positions connector 420 such that a fluid connection between one of first output port 330 or second output port 320 is achieved. Motor 470 may engage a gear type mechanism 475 (e.g., worm gear, sprocket gear, etc.). Gear mechanism 475 may engage axis 425, which represents the axis of rotation of connector 420. Gear mechanism 475 translates the rotation of an axis of motor 470 into a force sufficient to drive connector 420 about its axis of rotation 425.

Electronic circuit 490 provides electronic control of motor 470 to position connector 420 in one of second state (e.g., output port 460 in fluid communications with second output port 320) or a first state (e.g., input port 450 in fluid communication with first output port 330).

Electronic circuit 490 comprises an input device 492, a timer 494, a reset timer 496 and a synchronized driver 498.

Input device 492 may represent a key input device (e.g., a button) that allows a user to input a preset time value for each key input. For example, if each key input represents 15 minutes then depression of the key input three times would represent a 45 minute time period. In another aspect of the invention, input device 492 may represent a keypad that includes the numbers 0 through 9. In this case, the user may enter a time value, such 10 minutes, 17 minutes, etc., up to a maximum time (e.g., 99 minutes). In another aspect of the invention the input device 492 may include a visual indicator showing the user the inputted time value. The visual indicator may be a series of lights and/or a numerical display.

Timer 494 receives the inputted time value and sets a countdown timer (not shown countdown timers utilizing semiconductor chips, such as a 555 timer are well known in the art) corresponding to the inputted time value. At the conclusion of the countdown timer represented by timer 494, motor 470 is activated to cause connector 420 to change from a one state to a next state (e.g., a first state to a second state).

Reset timer 496 represents a countdown timer that is set at a significantly long time. At the expiration of the reset timer 496, motor 470 is activated to cause connector 420 to move from one state to the other state, as will be discussed. Input device 492 may be used to input a reset time in a manner similar to the countdown time.

Synchronized driver 498 represents a driver that caused motor 470, through a series of gears 475, to move from one state to the other state (i.e., first to second or second to first).

Also shown is switch 499. Switch 499 may be used to determine when timer 494 and reset time 496 begin a respective countdown process. In accordance with the principles of the invention, switch 499 may be one of a vane switch, a diaphragm switch or other similar type switch that operates when water flow is detected. Switch 499 may be in communication with conduit 310a.

Although not shown it would be appreciated, that a source of electrical energy is provided to distribution device 350 in order to operate motor 470 and electronic circuitry 490. The source of electrical energy may be provided by one or more of commercially available batteries (e.g., alkaline), rechargeable batteries (e.g., NiMh, NiCd, Li ion), a combination of solar cell and rechargeable batteries, a supplied alternating current (AC) voltage or a supplied direct current (DC) voltage. In one aspect of the invention, commercially batteries may be in direct electrical communication with motor 470 and electronic circuitry 490 (including switch 499). In another aspect of the invention, a DC voltage may be provided through electrical wiring that may run alongside or integrated into corresponding conduit 130. In one aspect of the invention, the electrical wiring may be selected as a low DC voltage wiring that is commercially available.

In one exemplary embodiment of the invention, each of the distribution devices 350 (350, 351 . . . 350n) shown in FIG. 3 are preset in the first state or may be initialized to the first state, wherein water flow is directed to a corresponding sprinkler head 110 attached to first output port 330. In this case, when switch 499 determines water flow is present (i.e., water is turn-ed on), timer 494 is activated to begin the associated countdown timer. During the period time 494 is active, full water pressure applied to first distribution device 350 at input port 310 is applied to the sprinkler head 110 connected to first output port 330. As connector 420 of distribution device 350 is directed to first output port 330, water is prevented from exiting second output port 320 of distribution device 350.

When the countdown timer of timer 494 expires, connector 420 is moved from the first state to the second state. In this second state, water flow is prevented from being provided to corresponding sprinkler head 110 through first output port 330 and passes through distribution device 350 toward second output port 320.

The next distribution device (e.g., 350b) in the serial line, now receiving the full water pressure, detects fluid flow and switch 499 initiates timer 494 to begin a corresponding countdown time, as described with regard to distribution device 350a.

As discussed with regard to distribution device 350a, the full water pressure received at the input port 310 of distribution device 350b is applied to the corresponding sprinkler head 110 connected to the first output port 330 of distribution device 350b. When the countdown timer associated with timer 494 of distribution device 350b expires, the connector 420 in distribution device 350b is moved from its current position (i.e., first state) to the second state (i.e., second output port 320). In this case, water is allowed to flow through distribution device 350b to a next distribution device (e.g., 350c) in the serial line.

The process repeats for each distribution device 350 (e.g., 350d . . . 350n) within the serially connected distribution device 350s. That is, countdown timer of timer 494 is initiated when water is determined to be flowing at input port 310 of distribution device 350x (x=a . . . n). The waters directed to a corresponding sprinkler head 110 attached to first output port 330 of device 350x. At the expiration of the countdown timer associated with timer 494 of device 350x, connector 420 is moved from its first position to its second position. In this case, water is allowed to flow through distribution device 350x to a next distribution device (e.g., 350x+1).

As would be recognized, the countdown timer associated with timer 494 in each of the devices 350a-350n may be independently set.

In this case, the amount of water applied to each of the attached sprinkler head 110 may be independently controlled. Such independent control is advantageous as it allows different levels of watering to occur for different plant types (e.g., grass, plants, trees, etc.).

At the expiration of the reset time in each distribution devices 350a-350n, the corresponding connector 420 is moved from the current state (i.e., the pass through state) to the first state.

Hence, in accordance with the principles of the invention, each of the distribution devices 350a-350n is positioned in a first state for a next water flow condition.

Figure 5A:
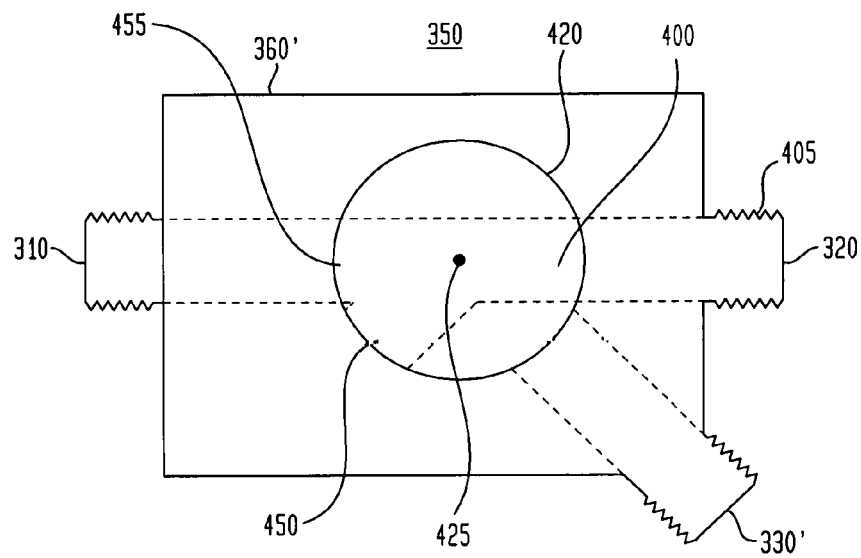
FIGS. 5A and 5B illustrate a water control device in accordance with a second embodiment in accordance with the principles of the invention.
Figure 5B:
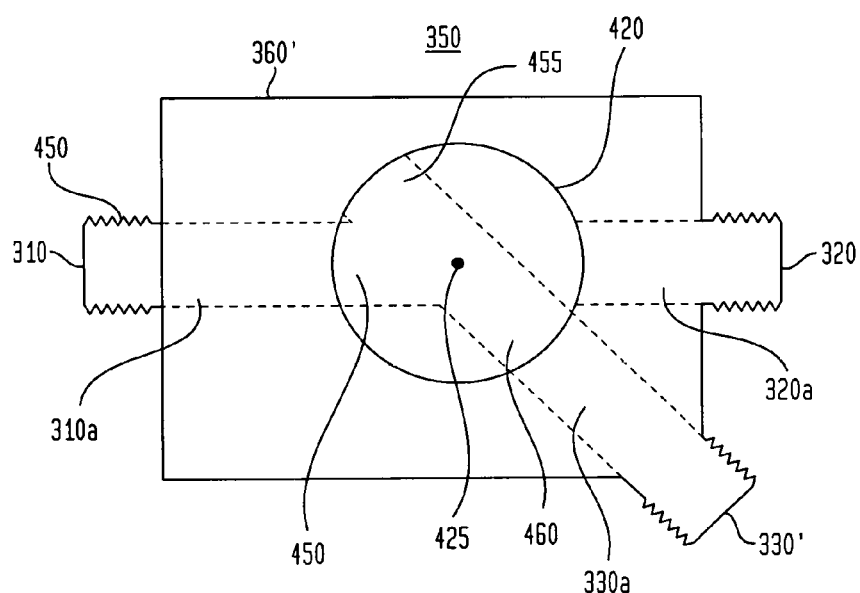

FIGS. 5A and 5B illustrate an exemplary cross-sectional view of distribution device 350 in accordance with a second exemplary embodiment in accordance with the principles of the invention. In this illustrative exemplary embodiment, the first and second output ports, 330, 320, respectively, are positioned at a substantially forty-five (45) degree angle with respect to each other.

The exemplary embodiment of the invention, shown in FIGS. 5A and 5B, operates in a manner similar to that described with regard to the embodiment shown in FIGS. 4A and 4B. Thus, a detailed description of the operation of the embodiment shown in FIGS. 5A and 5B would be understood by those skilled in the art from their reading of the operation of the embodiment shown in FIGS. 4A and 4B. Thus, a detailed description of the embodiment shown in FIGS. 5A and 5B need not be described in detail, herein.

As would be recognized, the orientation of the output ports 320, 330 with respect to each other provides for a smoother flow of water to each of the output ports 320, 330.

Although not shown, it would be recognized that output ports 320, 330 may be oriented at an angle of 22.5 degrees with regard to input port 310 without altering the scope of the invention. Orientation of output ports 320, 330 at 22.5 degrees with regard to input port 310 maintains an orientation of 45 degrees between output ports 320, 330 while requiring a minimum movement of connector 420.

Figure 1B:
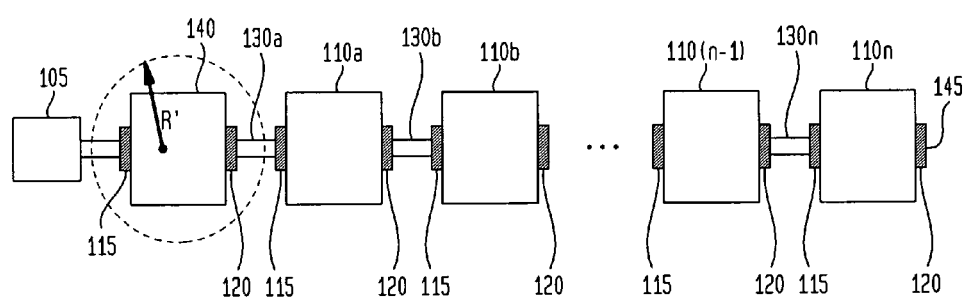
Figure 2:
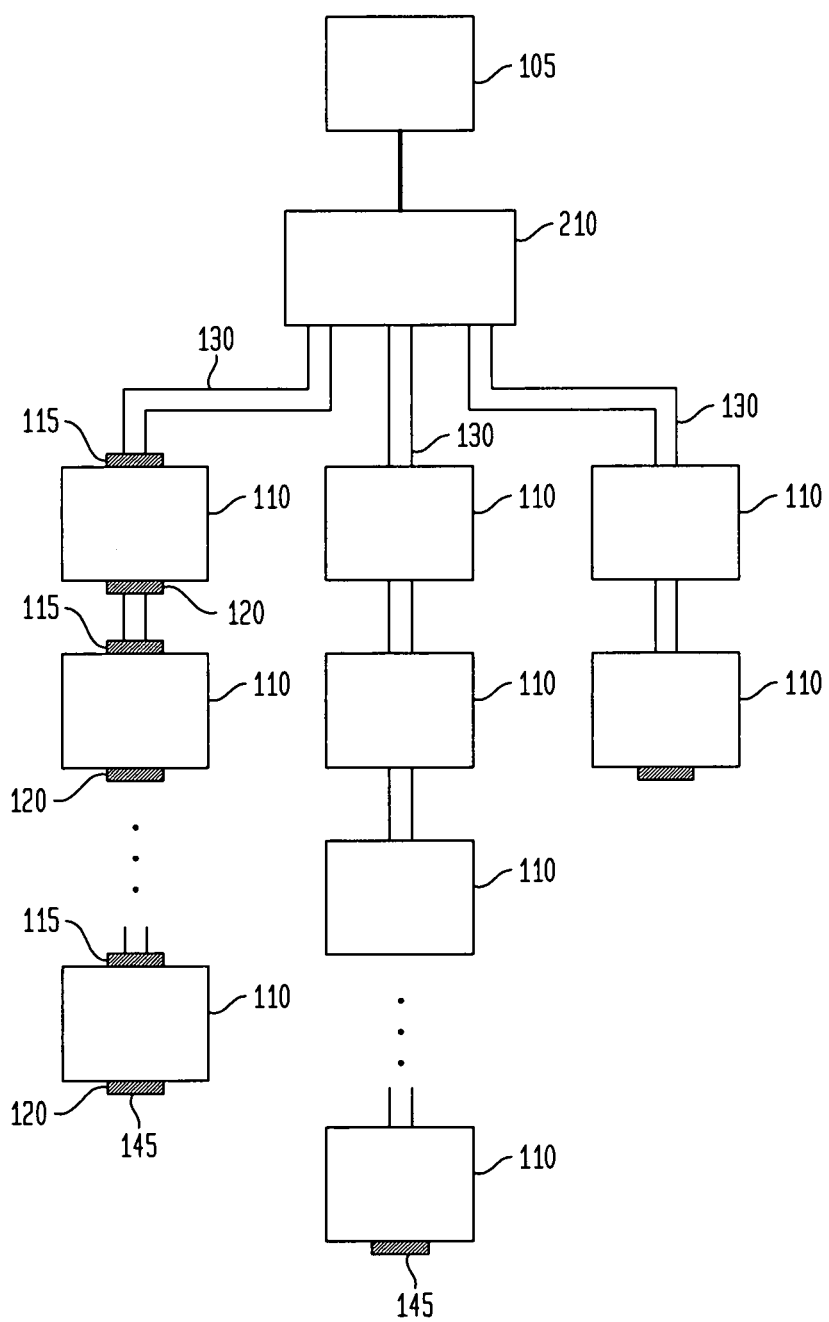
FIG. 2 illustrates a conventional in-ground sprinkler system.

In one aspect of the invention, the reset timer 496 may be set to be commensurate with a maximum expected time of water distribution. For example, using control timer 140, as shown in FIG. 1, the reset timer of each of distribution devices 350a-350n may be set to be comparable to the time of water distribution determined by control timer 140. In this case, each of the distribution device 350a-350n in the serial circuit will transition from one state to the other state at the expiration of the reset time.

In one aspect of the invention, the reset timer may be preset to a fixed time or may be set by a user through an input device, as previously discussed.

The reset timer may represent an absolute time (e.g., 0.5, 1, 2 6, 8, 10 hours, etc.) or may be a relative time (e.g., 2, 4, 6 hours) after detection of a fluid flow at a corresponding input port 310. In accordance with the principles of the invention, at the expiration of the reset timer the position of connector 420 of a corresponding control device 350 is positioned from one state to its other state. In one aspect, the connector 420 is position such that a next fluid flow is directed toward the first output port 330 and to attached sprinkler head 110 (e.g., first state).

Figure 6:
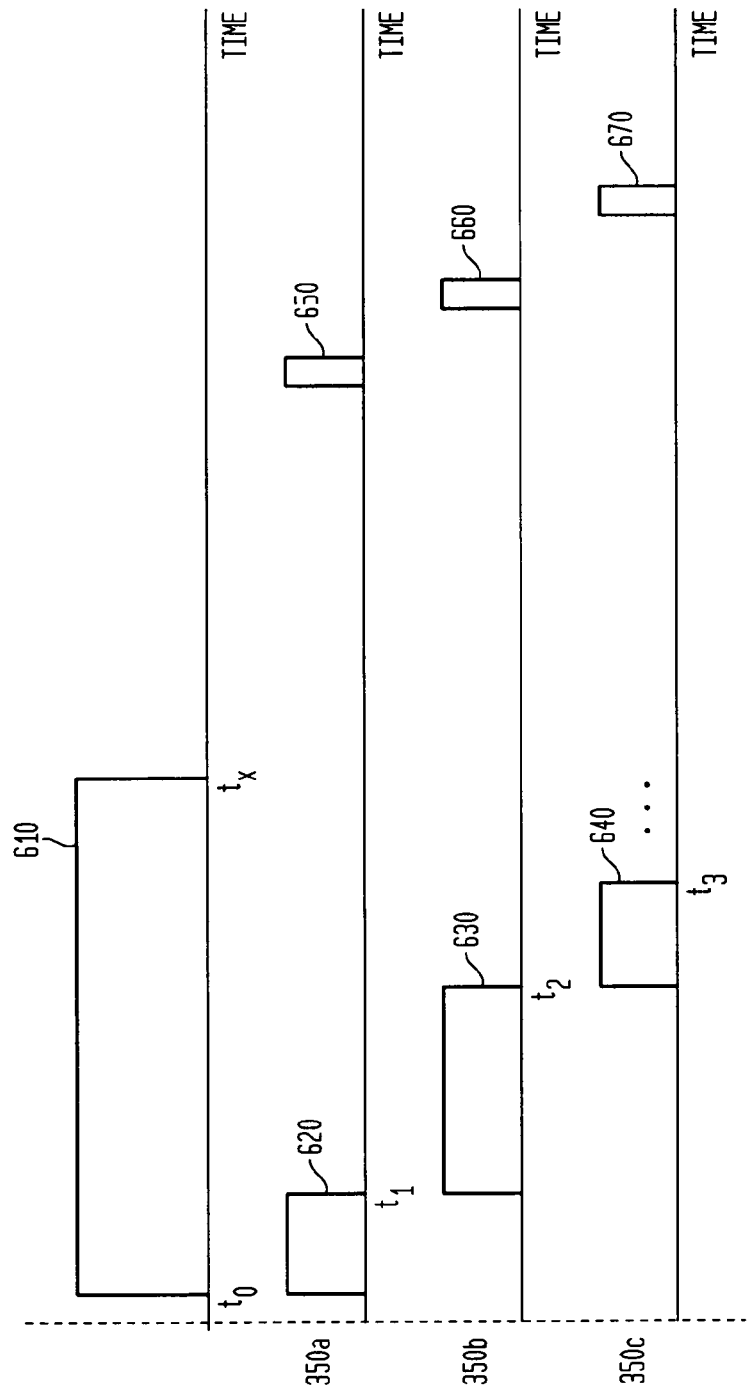
FIG. 6 illustrates an exemplary timing diagraming in accordance with the principles of the invention.

FIG. 6 illustrates an exemplary timing diagram in accordance with the principles of the invention.

In this illustrated embodiment, fluid flow is initiated at time t0 and extends for a predetermined time (tx). The duration of the fluid flow 610 (t0-tx) may be determined by a controller (FIG. 1, 140) that may be mechanical or electronic, as previously discussed.

At time t0, when fluid begins to flow, the first control device 350a detects the fluid flow and initiates a countdown timer, which may be prefixed or inputted, as previously described. Water flow is directed toward first output port 330 (see FIG. 4A, for example), for the prefixed or inputted countdown timer 620. At the expiration of the countdown timer, time t1, fluid flow is directed toward next control device 350b. In this case, control device 350b initiates a countdown timer for a prefixed or inputted time period 630.

At the expiration of the countdown timer, time t2, fluid flow is directed toward next control device 350c, which initiates a countdown timer 640. At the expiration of the countdown timer 640, at time t3, fluid flow is directed toward next control device 350d (not shown). This process repeats for each of the control devices 350a-350n for the duration of the fluid flow 610.

In one aspect of the invention, a reset timer is initiated at each of the control devices 350a-350n upon detection of fluid flow. At the conclusion of a reset time, e.g., 650, 660, 670, the corresponding control device 350 returns to its initial state, etc.

Figure 7:
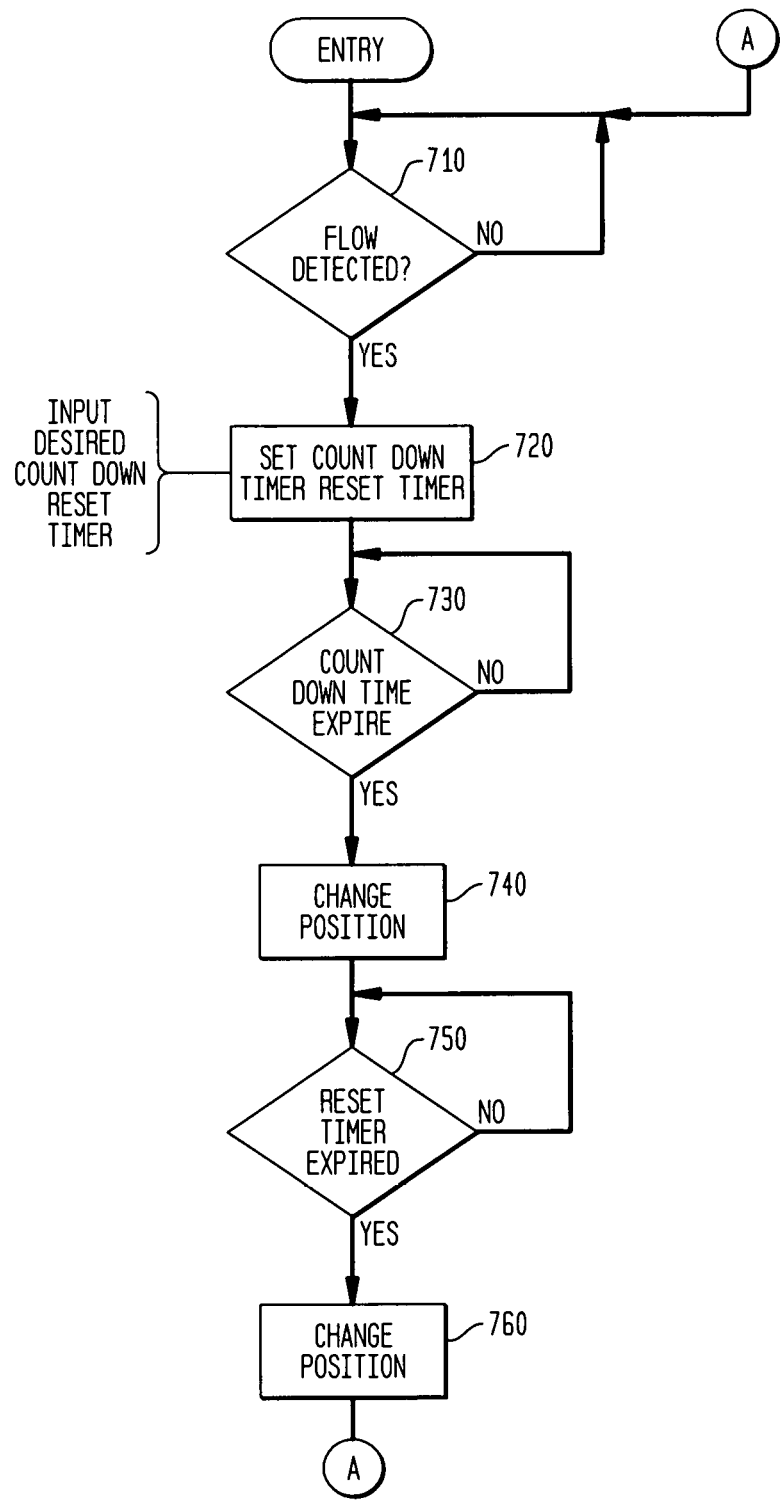
FIG. 7 illustrates an exemplary processing associated for controlling water flow in accordance with the principles of the invention.

FIG. 7 illustrates an exemplary process operable in a control device 350 in accordance with the principles of the invention.

At step 710 a determination is made whether fluid flow is detected. If the answer is negative, the processing continues to determine whether fluid is flowing at step 710.

Otherwise, processing continues to step 720, where a countdown timer and a reset timer are set. One or both of the countdown timer and reset timer may be provided by a user input or may be a preset value. At block 730, a determination is made whether the countdown timer has expired. If not, then processing continues to determine whether the countdown timer has expired at block 730.

However, when the countdown timer has expired, then at block 740, the position of the control device is altered, such that the fluid flow is directed to a second output. At block 750, a determination is made whether the reset timer has expired. If the reset timer has not expired, then processing continues to monitor whether the reset timer has expired at block 750, while water continues to flow through the control device.

However, when the reset timer has expired, then processing continues to block 760, wherein the position of the control device is altered, such that the fluid flow is directed to a first input.

Figure 8A:
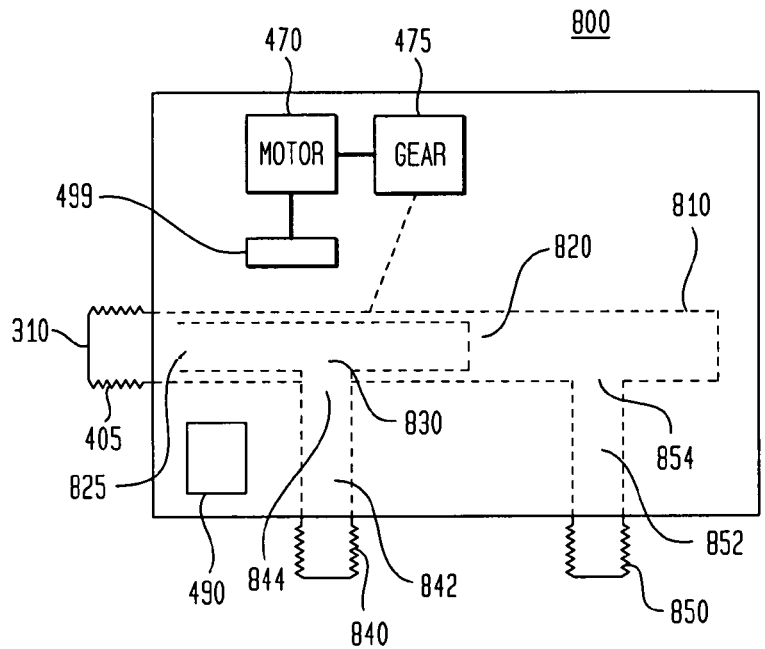
FIGS. 8A and 8B illustrate a water control device in accordance with a third embodiment in accordance with the principles of the invention.
Figure 8B:
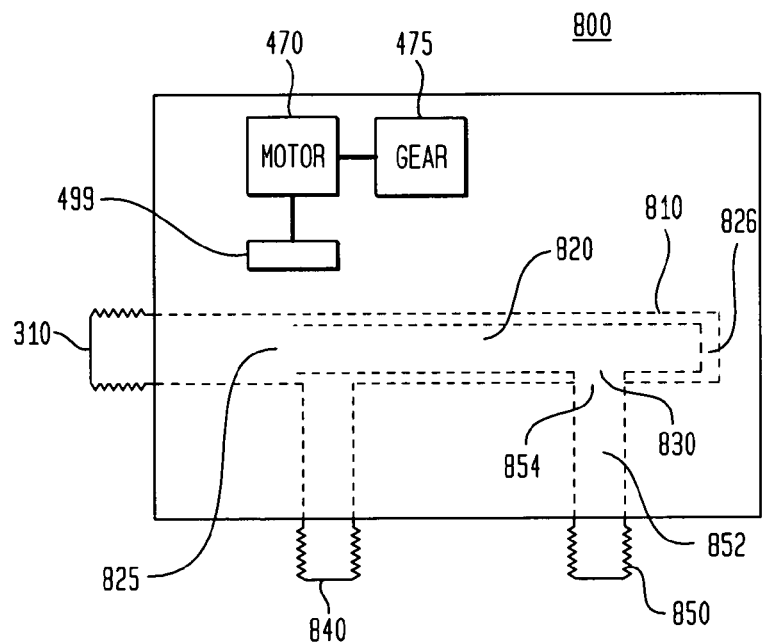

FIGS. 8A and 8B illustrate a water control device 800 in accordance with a third embodiment of the invention.

FIG. 8A illustrates an exemplary water control device 800 in a first aspect of the invention. In this illustrated aspect, water control device 800 includes motor 470, gear 475 and switch 499, as previously described. Further illustrated is electronic circuit 490, and input port 310, as previously described.

Further illustrated is channel 810 extending from the input port 310 through water control device 800. Channel 810 includes two ports 844 and 854. Connected to channel 810 at ports 844 and 854, respectively, are channels 842 and 852 respectively. Channels 842 and 852 fluidly connect ports 844 and 854, respectively to corresponding first output port 840 and a second output port 850. Ports 844, 854 allows fluid flow through one of first output port 840 and second output port 850.

Further illustrated is valve 820. Valve 820 is slidable within channel 810. Valve 820 includes a valve input port 825 and a valve output port 830. In one aspect of the invention, valve 820 may represent a hollow cylindrical tube have a first open end 825 and a closed second end 826.

As shown in FIG. 8A, valve output port 830 is aligned with port 844 such that fluid entering input port 310 flows through channel 810 into first open end 825 and is directed to channel 842 and output port 840.

In a second aspect, as shown in FIG. 8B, valve 820 is positioned in a second position. In this second position, fluid entering input port 310 flows through channel 810 into first open end 825 and is directed to pass through output port 830, which is aligned with port 854, to output port 850.

In this aspect of the invention, valve 820 blocks fluid passage to output port 840.

The operation of water control device 800 is similar to that shown in FIG. 4 and the exemplary processing shown in FIG. 7 is applicable to the operation of water control device 800. Hence, further detail discussion regarding the operation of the device 800 is not necessary.

In accordance with the principles of the invention, a large scale sprinkler system may be constructed using a plurality of water control devices as shown in FIGS. 4A, 5A and 8A, to allow coverage of large areas without the expense of installing in-ground type systems. In addition, the sprinkler system constructed in accordance with the principles of the invention may be reconfigured as desired without the expense of digging up in-ground sprinkler heads. In addition, the sprinkler system need not be drained or purged as the devices and connecting hoses may be stored during the winter periods.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor, controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Furthermore, a computer, a processor and/or dedicated hardware/software are described herein as being capable of performing the processing described herein, and it would be recognized that a computer, a processor and/or dedicated hardware/software are well-known elements in the art of signal processing and, thus, a detailed description of the elements of the computer, processor and/or dedicated hardware/software need not provided in order for one skilled in the art to practice the invention described, herein. For example, electronic circuit 490 may comprise an embedded processor or special purposed hardware configuration that operates software or logic instructions to implement the processing shown herein.

Returning to FIGS. 1A, 1B and 3, in accordance with the principles of the invention, as a full pressure is applied to each of the sprinkler heads, in a timely manner, the spacing of each sprinkler head 110 may be separated by the distance R (FIG. 1A) as opposed to the distance R' (FIG. 1B). Thus, the number of sprinkler heads 110 needed to cover a desired area is reduced, while at the same time allowing any number of sprinkler heads 110 to be connected in series.

The invention has been described with reference to specific embodiments. One of ordinary skill in the art, however, appreciates that various modifications and changes can be made without departing from the scope of the invention as set forth in the claims. Accordingly, the specification is to be regarded in an illustrative manner, rather than with a restrictive view, and all such modifications are intended to be included within the scope of the invention.

Benefits, other advantages, and solutions to problems have been described above with regard to specific embodiments. The benefits, advantages, and solutions to problems, and any element(s) that may cause any benefits, advantages, or solutions to occur or become more pronounced, are not to be construed as a critical, required, or an essential feature or element of any or all of the claims.

As used herein, the terms "comprises", "comprising", "includes", "including", "has", "having", or any other variation thereof, are intended to cover non-exclusive inclusions. For example, a process, method, article or apparatus that comprises a list of elements is not necessarily limited to only those elements but may include other elements not expressly listed or inherent to such process, method, article, or apparatus. In addition, unless expressly stated to the contrary, the term "of" refers to an inclusive "or" and not to an exclusive "or". For example, a condition A or B is satisfied by any one of the following: A is true (or present) and B is false (or not present); A is false (or not present) and B is true (or present); and both A and B are true (or present).

The terms "a" or "an" as used herein are to describe elements and components of the invention. This is done for convenience to the reader and to provide a general sense of the invention. The use of these terms in the description herein should be read and understood to include one or at least one. In addition, the singular also includes the plural unless indicated to the contrary. For example, reference to a composition containing "a compound" includes one or more compounds. As used in this specification and the appended claims, the term "or" is generally employed in its sense including "and/or" unless the content clearly dictates otherwise.

All numeric values are herein assumed to be modified by the term "about," whether or not explicitly indicated. The term "about" generally refers to a range of numbers that one of skill in the art would consider equivalent to the recited value (i.e., having the same function or result). In any instances, the terms "about" may include numbers that are rounded (or lowered) to the nearest significant figure.

It is expressly intended that all combinations of those elements that perform substantially the same function in substantially the same way to achieve the same results are within the scope of the invention. Substitutions of elements from one described embodiment to another are also fully intended and contemplated.

What is claimed is:

1. An irrigation system comprising:
    a plurality of serially connected distribution devices, each of said distribution devices comprising:
        a housing comprising:
            a housing input port,
            a first housing output port, and
            a second housing output port;
        a valve, slidable within said housing, comprising:
            an input port, and
            an output port, said output port being in fluid communication with one of said first housing output port and said second housing output port;
        a motor configured to move said valve;
        a fluid activated switch configured to:
            generate an indication of a fluid at the housing input port;
        an electronic circuit comprising:
            a timer configured to count down a first time value; and
            a processor configured to:
                receive said indication;
                initiate said timer to countdown said first time value in response to receiving said indication; and
                provide instruction to said motor wherein said motor moves said valve output port from said first housing output port to said second housing output port at an expiration of a time period associated with said first time value.

2. The irrigation system of claim 1, further comprising:
    an input device comprising at least one element, said input device configured to input said first time value through said at least one element.

3. The irrigation system of claim 2, further comprising:
    a second timer configured to:
        count down a second time value, wherein said processor provides instruction to said motor to move said valve, wherein said valve output port is moved from said second housing port to said first housing output port at an expiration of a time period associated with said second time value.

4. The irrigation system of claim 3, wherein said input device is further configured to:
    input said second time value through said at least one element.

5. The irrigation system of claim 1, wherein said first housing output port is positioned at substantially parallel to said second housing output port.

6. The irrigation system of claim 1, further comprising:
    a water timer serially connected to a first one of said plurality of said serially connected distribution devices.

7. A fluid distribution device for operation in a sprinkler system comprising at least one sprinkler head, the fluid distribution device comprising:
    a housing comprising:
        a housing input port;
        a first housing output port; and
        a second housing output port;
    a valve, slidable within said housing, said valve comprising:
        an input port, and
        an output port, wherein in a first orientation said housing input port is in fluid communication with said first housing output port, through said valve and in the second orientation the housing input port is in fluid communication with said second housing output port through said valve;
    a motor configured to move said valve from said first orientation to said second orientation;
    a countdown timer configured to:
        countdown a time value;
    a fluid activated switch configured to:
        detect a flow of fluid at the housing input port; and
        generate an indication of the detection of the fluid at the housing input port; and
    a processor configured to:
        initiate the countdown timer in response to the detection of the indication, and
        upon detection of an expiration of the countdown of the time value, cause said motor to position said valve to the second orientation.

8. The device of claim 7, further comprising:

a second countdown timer configured to:

countdown a second time value, wherein said motor moves said valve from said second orientation to said first orientation.

9. The device of claim 7, further comprising:

an input device comprising at least one element, said input device configured to input said first time value through said at least one element.

10. The device of claim 9, wherein said at least one element comprises at least one of: a button, a key, or a switch.

11. The device of claim 7, wherein said first housing output port and said second housing output port are substantially parallel to each other.

12. A system to control distribution of fluid flow to a water sprinkler, said system comprising:

a plurality of water sprinklers, said water sprinklers providing an outlet to dispense fluid;

a plurality of distribution control devices, one of said plurality of distribution control devices coupled to a corresponding one of said plurality of water sprinklers, wherein said distribution control device controls fluid flow to an associated one of the water sprinklers said distribution control device comprising:

a housing comprising:
an input port,
a first output port, and
a second output port, a valve slidable within the housing;

a fluid activated switch configured to:
detect a fluid at the housing input port, and
generate an indication of the detection of the fluid at the housing input port; and a controller configured to:
receive the indication;
initiate a count-down timer to count down from a first predetermined time upon receiving said indication;
direct said fluid from said input port to said first output port through said valve for said first predetermined time; and
direct said fluid from said input port to said second output port through said valve after expiration of said first predetermined time, wherein an output port of the valve is positioned at the second output port.

13. The system of claim 12, wherein said controller further configured to:

set a second count-down timer to a second predetermined time upon receiving said indication; and direct said valve output port from said second output port to said first output port after expiration of said second predetermined time.

14. The system of claim 12, wherein said first output port is oriented at substantially parallel to said second output port.

* * * * *